United States Patent [19]
Mauer

[11] Patent Number: 5,977,228
[45] Date of Patent: Nov. 2, 1999

[54] PLASTICIZED AQUEOUS COATING COMPOSITIONS

[75] Inventor: David H. Mauer, Kenosha, Wis.

[73] Assignee: S. C. Johnson Commercial Markets, Inc., Sturtevant, Wis.

[21] Appl. No.: 08/882,902

[22] Filed: Jun. 26, 1997

[51] Int. Cl.$^6$ ..................................................... C08K 5/09
[52] U.S. Cl. ..................... 524/284; 524/556; 524/560; 524/561; 524/569; 524/773; 524/831; 524/833
[58] Field of Search ..................................... 524/284, 569, 524/560, 561, 556, 773, 831, 833

[56] References Cited

U.S. PATENT DOCUMENTS

| | | | |
|---|---|---|---|
| 3,554,790 | 1/1971 | Gehrun et al. | 117/161 |
| 4,064,092 | 12/1977 | Burroway et al. | 260/29.6 |
| 4,113,682 | 9/1978 | Nagata et al. | 524/512 |
| 5,585,427 | 12/1996 | Schimmel et al. | 524/377 |

FOREIGN PATENT DOCUMENTS

| 0 571977A2 | 12/1903 | European Pat. Off. | C09D 7/12 |
|---|---|---|---|
| 0 449038A1 | 10/1991 | European Pat. Off. | C09G 1/04 |

*Primary Examiner*—James J. Seidleck
*Assistant Examiner*—Olga Asinovsky
*Attorney, Agent, or Firm*—Warren R. Bovee; Renee J. Rymarz; Neil E. Hamilton

[57] ABSTRACT

This invention provides an aqueous coating composition, more particularly an aqueous floor finish composition, comprising water, at least one polymeric film forming agent, and a plasticizing agent, wherein the improvement comprises at least a portion of the plasticizing agent being at least one tertiary alkyl monocarboxylic acid having an average of from about 6 to 30 carbon atoms per molecule. Such compositions have one or more improved properties such as increased hardness as compared with the same compositions using only conventional plasticizers such as tributoxyethyl phosphate, improved wetting of the substrate by the composition during application, improved coating film leveling, improved multiple coat gloss development, and improved resistance to wear, black heel marking and scuffing.

26 Claims, No Drawings

PLASTICIZED AQUEOUS COATING COMPOSITIONS

CROSS-REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

1. Technical Field

This invention relates to an aqueous coating composition such as a floor finish that contains a plasticizing agent that comprises at least one tertiary alkyl monocarboxylic acid.

2. Background Art

Aqueous coating compositions are well known and find use as protective coatings for various substrates such as wood, metal, plastic and the like. Such compositions typically contain a film-forming polymer such as an acrylic polymer. That polymer forms a continuous protective coating over the substrate to, often in conjunction with other additive materials such as other polymers, pigments, dyes, ultraviolet light absorbing agents and the like, help protect it from damage caused by the sun, abrasion, foot traffic, pressure, and so forth. The film-forming polymers are typically selected for their physical properties such as water solubility, flexibility, hardness, resilience, toughness and the like to fit the needs of the substrate being protected and the environment in which the coating will be used.

One way to modify the properties of the polymers included in the coating composition is to include a "plasticizing agent" or "plasticizer". A plasticizing agent is typically a compound that can associate with the polymer and thereby modify the physical properties of the polymer or of the coating composition itself. For example, a plasticizing agent may serve to change the hardness, flexibility, or ability of a polymer or a coating formed from it to form a continuous film. The plasticizing agent is thus used to impart desirable properties to the film left behind when the coating composition is applied to the substrate and the volatile components are removed such as by drying. These desirable results are achieved by the plasticizing agent without having to change the nature of the polymer itself or to obtain properties that are not possible to get by simply modifying the polymer itself.

Plasticizers are commonly added to aqueous floor finishes as can be seen from an examination of U.S. Pat. No. 3,467,610 to Fiarman et al.; U.S. Pat. No. 3,320,196 to Rogers; U.S. Pat. No. 3,308,078 to Rogers et al.; U.S. Pat. No. 4,013,607 to Dwyer et al.; and U.S. Pat. No. 4,317,755 to Gregory. The plasticizing agents employed may be of the permanent type that are insufficiently volatile to remain in the coating film after drying or of the fugitive type that substantially evaporate along with the water and other volatile components of the coating composition during the drying process. One of the most commonly used plasticizing agents is tributoxyethyl phosphate since it not only acts as a plasticizer, but also facilitates good coating film formation as a leveling agent as noted in the Gregory '755 Patent. Tributoxyethyl phosphate is a somewhat expensive raw material and its use adds a significant cost to the composition.

One attempt to avoid the use of a plasticizer such as tributoxyethyl phosphate in a floor finish composition is U.S. Pat. No. 4,460,734 to Owens et al. that teaches self leveling aqueous floor polish compositions that do not require the use of tributoxyethyl phosphate as a leveling agent. Instead, Owens et al. teach using polyalkoxylated linear aliphatic alcohols as leveling agents.

Fatty acids and salts are also taught as being useful in aqueous floor finish compositions, but the purpose for their use is in the form of fatty acid salts to serve as emulsifiers or leveling agents as noted in the Rogers '196, Rogers et al. '078 and Gregory '755 Patents. The Gregory '755 Patent notes that the fatty acids useful include $C_{12}$–$C_{18}$ fatty acids of animal, vegetable or synthetic origin and prefers the use of tall oil fatty acids in amounts of up to 10% when such ingredients are used.

As will be discussed later, I have found that a certain class of synthetic fatty acids, $C_6$–$C_{30}$ tertiary alkyl monocarboxylic acids, unexpectedly provide very beneficial properties to aqueous coating compositions when they are used as a portion of the total amount of plasticizing agent in such compositions, especially in aqueous floor finish compositions.

The $C_6$–$C_{30}$ tertiary alkyl monocarboxylic acids have been known for some time and some of them are commercially available from Exxon Chemical Americas of Houston, Tex. under the trade name of "NeoAcids" such as "Neo Decanoic Acid" that has an average of 10 carbon atoms per molecule. Except for certain purified products, these products are typically provided as mixtures of structural isomers. Their properties and potential uses are described in Exxon's product brochure no. SC89-134-500C entitled NeoAcids Properties, Chemistry and Applications, copyright 1982 (16 pages). However, the use of such acids in unmodified form as plasticizing agents is not suggested in that brochure. A tertiary alkyl monocarboxylic acid having an average of 10 carbon atoms per molecule is also commercially available as "Versatic Acid" from Shell Chemical Company of Houston, Tex.

U.S. Pat. No. 3,037,955 to Carman teaches thermoplastic acrylic resin coating compositions that are organic solvent solutions of such resins. These compositions may include from 0.5% to 3.0% of an acid or anhydride in the composition to improve the adhesion of the coating to a substrate when it is dried at up to 180° F. (82.2° C.). Among the various acids and anhydrides that are said to be useful is ethyl hexoic acid that is a $C_8$ secondary alkyl monocarboxylic acid rather than a tertiary alkyl monocarboxylic acid. These coating compositions are not aqueous compositions.

Two Patents to Inskip, U.S. Pat. Nos. 4,180,620 and 4,210,705, describe the use of from 0.01% to 0.5% by weight of a divalent metal salt of neo decanoic acid as an adhesion control agent for polyvinyl butyral. Nothing is said concerning the use of the monocarboxylic acids alone as a plasticizing agent. Inskip teaches that quantities in excess of 0.5% provide little or no additional benefit.

U.S. Pat. No. 4,274,973 to Stanton teaches the use of tertiary alkyl monocarboxylic acids such as neodecanoic acid in aqueous water-soluble soap lubricants for conveyor belts and the like to reduce viscosity of the lubricants and to improve lubricity effectiveness. The Stanton compositions do not contain film-forming polymers and are aqueous mixtures of 2%–40% by weight of fatty acid soaps and neodecanoic acid that may optionally further include anionic or cationic surfactants, and chelating agents.

BRIEF SUMMARY OF THE INVENTION

One object of this invention is to provide an aqueous coating composition containing plasticizing agents, especially floor finish compositions, that have one or more improved properties such as increased hardness as compared with the same compositions using only conventional plasticizers such as tributoxyethyl phosphate, improved wetting of the substrate by the composition during application, improved coating film leveling, improved multiple coat gloss development, and improved resistance to wear, black heel marking and scuffing.

Another object of this invention is to provide such compositions in a more economical formulation by substituting a portion of a more expensive conventional plasticizing agent with a less expensive plasticizing agent.

These and other objects of the present invention are provided by an aqueous coating composition, more particularly by an aqueous floor finish composition, comprising water, at least one polymeric film forming agent, and a plasticizing agent, wherein the improvement comprises at least a portion of the plasticizing agent being selected from at least one tertiary alkyl monocarboxylic acid containing an average of from about 6 to about 30 carbon atoms per molecule.

More particularly, the monocarboxylic acid is selected from those of the formula RR'R"CCOOH wherein each R, R' and R" group is an alkyl group containing at least one carbon atom and the average total number of carbon atoms in each R, R' and R" group is in the range of from 4 to about 30. More preferably, the average total number of carbon atoms in each R, R' and R" group is from about 4 to 20. Even more preferably, the average total number of carbon atoms in each R, R' and R" group is from about 7 to about 14. Most preferably, the average total number of carbon atoms in each R, R' and R" group is from about 7 to about 10.

This invention also relates to a method of improving the physical properties of an aqueous coating composition, more particularly of an aqueous floor finish composition, comprising water, at least one polymeric film forming agent, and a plasticizing agent, wherein the improvement comprises replacing at least a portion of the plasticizing agent with at least one tertiary alkyl monocarboxylic acid containing an average of from about 6 to about 30 carbon atoms per molecule.

DETAILED DESCRIPTION OF THE INVENTION

The aqueous coating compositions of the present invention are an improvement over conventional aqueous coating compositions, particularly over aqueous floor finish or floor polish compositions which are well known in the art as exemplified by the plasticizing agent-containing coating and floor finish compositions described in U.S. Pat. No. 3,467,610 to Fiarman et al.; U.S. Pat. No. 3,320,196 to Rogers; U.S. Pat. No. 3,308,078 to Rogers et al.; U.S. Pat. No. 4,013,607 to Dwyer et al.; and U.S. Pat. No. 4,317,755 to Gregory which are hereby incorporated by reference to teach such coating compositions and the component used to form such compositions.

The composition must contain at least one film-forming polymer that is plasticized by the plasticizing agent which requires that the plasticizing agent be sufficiently soluble in the film-forming polymer to affect its physical properties. Such polymers may be addition polymers such as acrylic polymers and styrene/acrylic polymers or condensation polymers such as polyester polymers, polyurethane polymers, polyether polymers, polyaldehyde polymers, polycarbonates and polyamides.

The film-forming polymers must be soluble or dispersible in water such as by the inclusion of a sufficient number of functional groups that are hydrophilic such as polyether groups or, for example, carboxyl groups that may be neutralized to form a hydrophilic ionic salt, that permits the polymer to be solvated by water and either dissolved in water to form a clear solution or dispersed in water to form an aqueous dispersion of the polymer. As is well known in the art, film-forming polymers, especially those of relatively high molecular weight (for example, those over 100,000 number average molecular weight) which may or may not contain functional groups can be emulsified in water with the assistance of surface active agents to form aqueous emulsions or latices of the polymers.

The molecular weight of the film-forming polymers can vary depending upon the ultimate use of the aqueous coating composition. Film-forming polymers of lower molecular weight such as polymers of styrene and acrylic acid generally have number average molecular weights of from about 1,000 to 6,000–10,000 and are water soluble when neutralized with inorganic or organic alkaline materials such as ammonium hydroxide or triethanolamine when a sufficient level of carboxylic acid groups is present in the polymer. However, such polymers usually require a further crosslinking agent such as polyurea or melamine crosslinking agents to form a film. In floor finish compositions, such lower molecular weight polymers are often included in addition to a high molecular weight emulsion polymer to serve as leveling agents that help the formation of uniform coating films.

High molecular weight film-forming polymers are generally those having number average molecular weights in excess of about 10,000, more typically in excess of 50,000 and most typically in excess of about 100,000 and are typically water insoluble. Such polymers can range up to number average molecular weights of 1,000,000 or more when prepared as aqueous emulsion polymers. As noted previously, emulsion polymers need not contain functional groups that are hydrophilic and thus polystyrene latices can be employed as a film-forming polymer.

Addition polymers such as acrylic polymers are often used in aqueous coating compositions with plasticizing agents. Such acrylic polymers are well known in the art and are typically prepared from monomers such as acrylic acid, methacrylic acid, and substituted or unsubstituted $C_1$–$C_{20}$ alkyl esters of such acids (e.g., methyl methacrylate, butyl acrylate, butyl methacrylate, 2-ethylhexyl acrylate, octyl acrylate, and 2-hydroxyethyl methacrylate). Such acrylic polymers may further include aromatic vinyl monomers such as styrene and alpha-methyl styrene. The monomers are selected to provide the desired properties needed in the film formed from the polymer such as hardness, glass transition temperature, adhesion, and the like as is well known in the art.

Floor finish compositions generally use acrylic polymers are typically formed from methacrylic acid as the hydrophilic monomer along with monomers such as butyl acrylate, styrene, such as are discussed in the Rogers '196, Rogers et al. '078 and Gregory '755 Patents.

The compositions of the present invention include an effective amount of at least one plasticizing agent. The plasticizing agent must be sufficiently soluble in at least one of the film-forming polymers to modify the physical properties of the polymer to a desirable degree such as hardness or glass transition temperature. Depending upon the properties desired in the coating left behind after drying, the amount of plasticizing agent used based on the total amount of film-forming polymer and plasticizing agent can be 50% or greater by weight. A more typical level of plasticizing agent, particularly for aqueous floor finish compositions, is where the plasticizing agent is present as from about 0.1% to 25% by weight of the total weight of plasticizing agent and film-forming polymers.

Examples of conventional plasticizing agents include permanent plasticizers that remain in the film after drying include butyl benzyl phthalate, dibutyl phthalate, dimethyl phthalate, triphenyl phosphate, 2-ethylhexyl benzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodi-succinate, butyl phthalyl butyl glycolate, triethyl citrate, acetyl triethyl citrate, tributyl citrate, acetyl tributyl citrate, dibenzyl sebacate, tricresyl phosphate, tributoxyethyl phosphate, toluene ethyl sulfonamide, the di-2-ethylhexyl ester of hexamethylene glycol diphthalate, di-(methylcyclohexyl)-phthalate, and tributyl phosphate.

Examples of conventional fugitive plasticizers that are sufficiently volatile that they substantially leave the coating film upon drying include the monomethyl or monoethyl ether of diethylene glycol, isophorone, benzyl alcohol, and 3-methoxy-1-butanol.

The types and amounts of such plasticizing agents selected are based on the demand for compatibility and efficiency of the agents to affect the hardness and flexibility of the coating film left behind after drying.

In conventional aqueous floor finish compositions based on acrylic film-forming polymers, tributoxyethyl phosphate has been the plasticizing agent of choice because it not only serves as a plasticizing agent, but also serves as a leveling agent.

Aqueous floor finish compositions are generally divided into two types of compositions based on how the compositions are applied and on how the resulting finish is subsequently maintained.

The first type of aqueous floor finish composition is one where the user simply applies the composition to the floor and allows it to air dry at room temperature. In this situation, the floor finish achieves its maximum gloss level and appearance upon drying. No further buffing or polishing steps are required. These types of compositions are sometimes called scrub and recoat floor finishes and are typically sold for home use. Such compositions are characterized by hard coating films that have relatively high resistance to scuffing and scratching. Such compositions contain lower levels of plasticizing agents such as from about 1% to 10%, more preferably about 8%, by weight of plasticizing agent based on the total amount of plasticizing agent and film-forming polymers present.

The second type of aqueous floor finish composition is one which is typically used in commercial applications such as in stores and office buildings and is referred to as an "UHS" or "Ultra-High Speed" finish. Such compositions are formulated to have a softer coating film that responds better to motor-driven high speed buffing or polishing operations to provide a high gloss shine having a wet look appearance. Such coating films tend to lose their gloss more readily because they scratch more easily and thus require daily polishing or buffing to restore the desired gloss and appearance. For this reason, such compositions contain higher levels of plasticizing agents such as from about 10% to 25%, more preferably from about 10% to 20%, and most preferably about 20%, by weight of plasticizing agent based on the total amount of plasticizing agent and film-forming polymers present.

The improvement provided by the present invention relates to the substitution of some or all of the plasticizing agent with a plasticizing agent that is at least one tertiary alkyl monocarboxylic acid containing an average of from about 6 to about 30 carbon atoms per molecule. Such monocarboxylic acids can be represented by the formula RR'R"CCOOH wherein each R, R' and R" group is an alkyl group containing at least one carbon atom and the average total number of carbon atoms in each R, R' and R" group is in the range of from 4 to about 30. More preferably, the average total number of carbon atoms in each R, R' and R" group is from about 4 to 20. Even more preferably, the average total number of carbon atoms in each R, R' and R" group is from about 7 to about 14. Most preferably, the average total number of carbon atoms in each R, R' and R" group is from about 7 to about 10.

As noted earlier, such monocarboxylic acids are commercially available from Exxon Chemical Americas and Shell Chemical Company. Such monocarboxylic acids are synthetically produced materials that are typically supplied as a mixture of isomers of acids of various carbon chain lengths except for a few products that are refined to substantially comprise a relatively uniform carbon chain length. One example of such a refined product is Exxon's Neo Decanoic Acid, Prime Grade, that is reported to be 98% tertiary alkyl monocarboxylic acid of 10 carbon atoms and 2% tertiary alkyl monocarboxylic acid of 9 carbon atoms.

The film-forming polymers must be selected with the polymer solubility of the tertiary alkyl monocarboxylic acid in mind. If the monocarboxylic acid is not soluble in the polymer to the extent that it is effective to modify the physical properties of the polymer, then the monocarboxylic acid will not be useful to replace a portion of the plasticizing agent. While some applications may permit one to replace the entire amount of plasticizing agent with the monocarboxylic acids used in the present invention, it is more desirable to only substitute a portion of the plasticizing agent present with the monocarboxylic acids of the present invention.

In aqueous floor finish compositions, particularly those based on acrylic polymers, it is preferred that when the total amount of plasticizing agent is from 0.1% to 10% of the total weight of plasticizing agent and film-forming polymer, that the tertiary monocarboxylic acid be from about 20% to 40% of the total weight of the plasticizing agent present. A presently preferred combination of plasticizing agents for aqueous floor finish compositions is to use tributoxyethyl phosphate as the remainder of the plasticizing agent along with the foregoing amount of tertiary monocarboxylic acid.

Similarly, in aqueous floor finish compositions, particularly those based on acrylic polymers, it is preferred that when the total amount of plasticizing agent is from 10% to 25%, and more preferably from 10% to 20%, of the total weight of plasticizing agent and film-forming polymer, that the tertiary monocarboxylic acid be from about 20% to 50% of the total weight of the plasticizing agent present. A presently preferred combination of plasticizing agents for aqueous floor finish compositions is to use tributoxyethyl phosphate as the remainder of the plasticizing agent along with the foregoing amount of tertiary monocarboxylic acid.

Use of more than the maximum levels of tertiary monocarboxylic acids given above in aqueous floor finish compositions containing tributoxyethyl phosphate was found to cause an undesirable decrease in properties such as the leveling and wetting of the compositions.

It was unexpectedly found that the substitution of a portion of tertiary monocarboxylic acid in place of the tributoxyethyl phosphate plasticizing agent used in aqueous floor finish compositions actually increased the hardness of the coatings left behind upon drying over the level of hardness expected to be observed given the level of plasticizer used. This was an unexpectedly advantageous result since most plasticizing agents soften coating films and make them more prone to scratching and dirt pickup.

The balance of the required composition comprises water. Sufficient water is used to provide a suitable viscosity for application to the surface to be coated.

Additional minor amounts of ingredients can also be included to improve the performance of the compositions of the present invention.

Alkali soluble resins of the type conventionally used in aqueous floor finish compositions such as copolymers of acrylic acid and styrene of number average molecular weight from about 1,000 to about 5,000 having acid values of from about 140 to 350 milligrams of potassium hydroxide per gram of resin can be used in amounts of up to about 100% based on the total nonvolatile content of the composition to improve the leveling of the coating compositions, particularly of aqueous floor finish compositions.

If one or more of the polymers present contain ligands such as carboxyl groups that can reversibly associate with metal fugitive ligand complexing agents, then the latter compounds such as zinc ammonium carbonate, zirconium ammonium carbonate, and other zinc, cadmium, copper and nickel ammonium carbonate, ammonium formate or ammonium acetate complexes as well as titanate complexes of such metals, can be included to provide cured, but strippable floor finish compositions as described in the Rogers '196 and in the Rogers et al. '078 Patents. In conjunction with such complexing agents other than zirconium, a stabilizer such as ammonium hydroxide or a water soluble nonionic ethyleneoxide condensate emulsifier is also used Similarly, other ingredients that are commonly included in coating compositions, particularly in floor finish compositions, in minor amounts can be included in the improved compositions of the present invention. Ingredients of this type include alkaline materials such as ammonium hydroxide, inorganic and organic bases and the like to adjust the pH of the compositions, waxes such as polyethylene waxes, surfactants—particularly those of the nonfoaming type—such as anionic, nonionic or amphoteric surfactants such as ethoxylated fatty alcohols, alkyl sulfonates and ethoxylated alkyl sulfonates, fluorochemical compound leveling agents, and organic solvents to act as coalescing agents and to extend the drying time and leveling of such compositions such as polyhydroxy polyethers, lower alkanols or high boiling glycols.

This invention provides, in its more preferred embodiment, an aqueous floor finish composition for application to wood, vinyl, concrete and other types of flooring materials. These compositions are applied with conventional floor finish application equipment such as pad applicators, sprayers, motorized application equipment and the like.

In its broader aspects, aqueous coating compositions are provided that can be used as protective coatings for wood, metal, glass, plastic and the like where the physical properties of the coating composition can be tailored to the needs of the substrate being coated and the intended use of the coating by the choice and amount of tertiary monocarboxylic acid plasticizing agent.

The following Examples are provided to show various aspects of the present invention without departing from the scope and spirit of the invention. Unless otherwise indicated, all parts and percentages used in the following Examples are by weight. The following ingredients were used in the Examples except that n-decanoic acid, n-heptanoic acid, 2-ethylhexanoic acid, benzoic acid and cyclohexanecarboxylic acid made unstable finish formulations and were not tested for film properties. This is indicated by the asterisk.

| Chemical Name | Chemical Formula | Trade Name/Other Names | Acronym | Source |
|---|---|---|---|---|
| NEO (TERTIARY) CARBOXYLIC ACIDS: | | | | |
| 2,2-dimethyl octanoic acid (major in mixture of isomers) | $C_6H_{13}C(CH_3)_2CO_2H$ | neo decanoic acid prime grade | NDA | Exxon Chemical |
| 2,2,4,4-tetramethyl pentanoic acid (major in mixture of isomers) | $(CH_3)_3CCH_2C(CH_3)_2CO_2H$ | neo nonanoic acid | NNA | Exxon Chemical |
| 2-methyl-2-ethylpentanoic acid (major in mixture of isomers) | $C_3H_7C(CH_2CH_3)(CH_3)CO_2H$ | neo octanoic acid, prime, ECR-938 | NOA | Exxon Chemical |
| 2-methyl-2-ethylbutanoic acid (major in mixture of isomers) | $C_2H_5C(CH_2CH_3)(CH_3)CO_2H$ | neo heptanoic acid, prime | NHA | Exxon Chemical |
| Neo 919 | Mixture - a blend of 75% $C_{10}$ to $C_{13}$ and 20+% $C_{14+}$ neo acid | | N919 | Exxon Chemical |
| SATURATED PRIMARY FATTY ACIDS: | | | | |
| n-decanoic acid* | $CH_3(CH_2)_8CO_2H$ | capric acid | DA | Aldrich Chem. |
| n-nonanoic acid | $CH_3(CH_2)_7CO_2H$ | pelargonic acid | NA | Aldrich Chem. |
| n-octanoic acid | $CH_3(CH_2)_6CO_2H$ | caprylic acid | OA | Aldrich Chem. |
| n-heptanoic acid* | $CH_3(CH_2)_5CO_2H$ | — | HA | Aldrich Chem |
| SECONDARY CARBOXYLIC ACIDS: | | | | |
| 2-methylhexanoic acid | $C_4H_9CH(CH_3)CO_2H$ | — | MHA | Aldrich Chem |
| 2-propylpentanoic acid | $(CH_3CH_2CH_2)_2CHCO_2H$ | — | PPA | Aldrich Chem |
| 2-ethylhexanoic acid* | $C_4H_9CH(CH_2CH_3)CO_2H$ | — | EHA | Aldrich Chem. |
| AROMATIC CARBOXYLIC ACID: | | | | |
| benzoic acid* | $C_6H_5CO_2H$ | — | BA | Aldrich Chem. |

-continued

| Chemical Name | Chemical Formula | Trade Name/Other Names | Acronym | Source |
|---|---|---|---|---|
| CYCLIC CARBOXYLIC ACID: | | | | |
| cyclohexanecarboxylic acid* | $C_6H_{11}CO_2H$ | — | CHCA | Aldrich Chem |
| CONVENTIONAL PLASTICIZERS: | | | | |
| oleic acid (unsaturated primary carboxylic acid) | $CH_3(CH_2)_7CH=CH(CH_2)_7CO_2H$ | Priolene 6900 | OLA | Unichem Chem. |
| isodecyl benzoate (benzoate derivative) | $C_6H_5CO_2CH(CH_3)CH_2(CH_2)_6CH_3$ | Velate ™ 262 | V262 | Velsicol Chemical Corp. |
| tributoxyethyl phosphate (phosphate derivative) | $CH_3CH_2P(OC_4H_9)_3$ | KP-140 TBXP | KP140 | Rhone-Poulenc, Inc. |

Additional Materials Used in the Examples:

| Name | Source | Further Identification |
|---|---|---|
| AC-316 Wax Emulsion | Allied-Signal | A polyethylene wax emulsified to 35% solids in water |
| E-43 Wax Emulsion | Eastman Chemical | A polypropylene wax emulsified to 40% solids in water |
| KP-140 | Rhone-Poulenc Inc. | Tributoxyethyl phosphate |
| Zinc Ammonium Carbonate | Hydrite Chemical | Aqueous 15 weight percent zinc oxide solution |
| Zonyl ® FSE | E. I. du Pont de Nemours & Co. Specialty Chemicals | A fluorochemical surfactant |
| Fluorad ® FC-120 | 3M Company | A fluorochemical surfactant |
| Emulsion Polymer A | | An emulsion polymer, at 35% solids in water, of methacrylic acid/butyl acrylate/methyl methacrylate/alpha-methyl styrene/styrene (15/31/16/8/30) having an acid value of about 100, a glass transition temperature of about 78° C. and weight average molecular weight of greater than about 200,000. |
| Emulsion Polymer B | | An emulsion polymer, at 33% solids in water, of methacrylic acid/isobutyl methacrylate/styrene/methyl methacrylate (13/40/30/17) having an acid value of about 85, a glass transition temperature of about 97° C. and weight average molecular weight of greater than about 200,000. |
| Emulsion Polymer C | | An emulsion polymer, at 40% solids in water, of methacrylic acid/butyl acrylate/methyl methacrylate (9/48/43) having an acid value of about 60, a glass transition temperature of about 39° C. and weight average molecular weight of greater than about 200,000. |
| Emulsion Polymer D | | An emulsion polymer, at 40% solids in water, of methacrylic acid/butyl acrylate/styrene (15/52/33) having an acid number of about 00 and weight average molecular weight of greater than about 200,000. |
| Resin X | | An addition polymer of acrylic acid/styrene/alpha-methyl styrene (33/32/35) having an acid number of about 250, a glass transition temperature of about 95° C. and weight average molecular weight of about 5,000, |
| Resin Dispersion Y | | An ammonia-neutralized aqueous dispersion, at 28% solids, of Resin X. |
| Resin Dispersion Z | | An ammonia-neutralized aqueous dispersion, at 28% solids, of a polymer of acrylic acid/styrene/alpha-methyl styrene (30/32/38) having an acid number of about 250, a glass transition temperature of about 95° C. and weight average molecular weight of about 7,500. |

EXAMPLE I

This example illustrates a screening prototype floor finish into which the previously referred to neo carboxylic acids, several primary & secondary carboxylic acids and conventional plasticizers were each incorporated as "Additive." These were compared for physical properties of the resulting films. The internal standard for comparative testing was the floor finish made with tributoxyethyl phosphate as the additive and later referred to as KP140.

Screening Floor Finish Formula

| Ingredient Name | % Actives | Mass per 100 | Wt. % Dry Film |
|---|---|---|---|
| Water, tap | — | 41.639 | — |
| Diethylene glycol n-ethyl ether | 100% | 4.000 | — |
| Dipropylene glycol n-propyl ether | 100% | 2.000 | — |
| Zonyl FSE | 14% | 0.057 | 0.04% |
| Fluorad FC-120 | 25% | 0.008 | 0.01% |
| Emulsion Polymer A | 35% | 31.788 | 60.09% |
| Emulsion Polymer C | 40% | 4.625 | 9.99% |
| Resin X | 98% | 1.887 | 9.99% |
| Water, tap | — | 6.980 | — |
| Ammonium hydroxide | 28% | 0.626 | — |
| Zinc Oxide | ≈100% | 0.134 | 0.72% |
| Zinc Ammonium Carbonate | 15% ZnO | 2.641 | 2.14% |

-continued

Screening Floor Finish Formula

| Ingredient Name | % Actives | Mass per 100 | Wt. % Dry Film |
|---|---|---|---|
| Additive | ≈100 | 1.300 | 7.02% |
| E-43 Wax Emulsion | 40% | 2.313 | 5.00% |
| AC-316 Wax Emulsion | 35% | 2.643 | 5.00% |
| Total | | 100.00 | 100.00% |
| % NVM, calculated | | 18.52% | |

The following general procedures were employed for producing the products set forth in Examples I–VI: A suitable blending vessel is charged with tap water, the solvents such as the DE, DPM and DP and the fluorochemicals such as FSE, FC-120. With good agitation, the water/solvent/fluorochemicals are mixed for a minimum of three minutes. The acrylic emulsion polymers such as Polymer Emulsions A, B, C and/or D are added and mixing is continued for a minimum of three minutes. The leveling resin dispersion such as Resin Dispersion Y or Z (or Resin X which is dispersed in water through ammonia neutralization) is then added and mixing is continued for a minimum of three minutes. The polyethylene wax emulsion such as AC-316 Wax Emulsion is added with a continued mixing for a minimum of three minutes. The zinc ammonium carbonate solution is slowly added subsequently in a steady stream or subsurface addition and mixing continued for a minimum of ten minutes. The plasticizer(s) such as KP140, all the additives mentioned in Example I including NDA, NNA and Neo 919 are next added. The plasticizers need to be added slowly in a steady stream or in portions and allowed to diffuse into the finish formulation with adequate mixing. If the plasticizer(s) are added too quickly, coagulum or gel or particulate can form. After all the plasticizer is added, mixing is continued for a minimum of ten minutes. The final addition is the E-43 polypropylene wax emulsion. After addition of polypropylene wax emulsion, continue to mix for a minimum of twenty minutes. The resulting floor finish is then filtered through a 50 micron filter and allowed to come to equilibrium for a minimum of seventy-two hours before being evaluated.

In the following Examples, neo decanoic (prime grade), neo nonanoic acid and Neo 919 acid blend from Exxon Chemical Company, were each incorporated into a screening prototype floor finishes of the type shown in Example I. The ratio of neo acid to tributoxyethyl phosphate was varied as indicated from zero to twenty weight percent of the dry film solids.

In Examples II and III, the equivalent of zinc to carboxyl varied whereas in Examples IV and V, they were constant. Physical properties of the resulting films were evaluated and are shown in the following Tables. The standard for comparative testing was the floor finish made with only tributoxyethyl phosphate as the additive as indicated at KP140-STD1, KP140-STD2, and KP140-STD3, respectively.

EXAMPLE II

Neo Decanoic Acid

| Ingredient | % Actives | NDA-100A | NDA-75A | NDA-50A | NDA-35A | NDA-25A | KP140-STD1 |
|---|---|---|---|---|---|---|---|
| Water, tap | — | 37.467 | 37.867 | 38.267 | 38.507 | 38.667 | 39.067 |
| Diethylene glycol n-ethyl ether | 100% | 3.900 | 3.900 | 3.900 | 3.900 | 3.900 | 3.900 |
| Dipropylene glycol n-methyl ether | 100% | 3.000 | 3.000 | 3.000 | 3.000 | 3.000 | 3.000 |
| Ammonium Hydroxide | 28% | 1.600 | 1.200 | 0.800 | 0.560 | 0.400 | 0.000 |
| Zonyl FSE | 0.14% | 0.060 | 0.060 | 0.060 | 0.060 | 0.060 | 0.060 |
| Fluorad FC-120 | 0.25% | 0.020 | 0.020 | 0.020 | 0.020 | 0.020 | 0.020 |
| Polymer Emulsion B | 33% | 41.667 | 41.667 | 41.667 | 41.667 | 41.667 | 41.667 |
| AC-316 Wax Emulsion | 35% | 1.143 | 1.143 | 1.143 | 1.143 | 1.143 | 1.143 |
| Zinc Ammonium Carbonate | 15% ZnO | 3.000 | 3.000 | 3.000 | 3.000 | 3.000 | 3.000 |
| Neo Decanoic Acid, Prime Grade | 100% | 4.000 | 3.000 | 2.000 | 1.400 | 1.000 | 0.000 |
| Tributoxyethyl phosphate | 100% | 0.000 | 1.000 | 2.000 | 2.600 | 3.000 | 4.000 |
| E-43 Wax Emulsion | 40% | 2.000 | 2.000 | 2.000 | 2.000 | 2.000 | 2.000 |
| Resin Dispersion Z | 28% | 2.143 | 2.143 | 2.143 | 2.143 | 2.143 | 2.143 |
| Total | | 100.000 | 100.000 | 100.000 | 100.000 | 100.000 | 100.000 |
| % NVM | | 20% | 20% | 20% | 20% | 20% | 20% |
| NDA:KP-140 | | 100:0 | 75:25 | 50:50 | 35:65 | 25:75 | 0:100 |

EXAMPLE III

Neo Nonanoic Acid

| Ingredient | % Actives | NNA-100 | NNA-75 | NNA-50 | NNA-35 | NNA-25 |
|---|---|---|---|---|---|---|
| Water, tap | — | 37.467 | 37.867 | 38.267 | 38.507 | 38.667 |
| Diethylene glycol n-ethyl ether | 100% | 3.900 | 3.900 | 3.900 | 3.900 | 3.900 |
| Dipropylene glycol n-methyl ether | 100% | 3.000 | 3.000 | 3.000 | 3.000 | 3.000 |
| Ammonium Hydroxide | 28% | 1.600 | 1.200 | 0.800 | 0.560 | 0.400 |
| Zonyl FSE | 0.14% | 0.060 | 0.060 | 0.060 | 0.060 | 0.060 |
| Fluorad FC-120 | 0.25% | 0.020 | 0.020 | 0.020 | 0.020 | 0.020 |
| Polymer Emulsion B | 33% | 41.667 | 41.667 | 41.667 | 41.667 | 41.667 |
| AC-316 Wax Emulsion | 35% | 1.143 | 1.143 | 1.143 | 1.143 | 1.143 |
| Zinc Ammonium Carbonate | 15% ZnO | 3.000 | 3.000 | 3.000 | 3.000 | 3.000 |
| Neo Nonanoic Acid | 100% | 4.000 | 3.000 | 2.000 | 1.400 | 1.000 |
| Tributoxyethyl phosphate | 100% | 0.000 | 1.000 | 2.000 | 2.600 | 3.000 |
| E-43 Wax Emulsion | 40% | 2.000 | 2.000 | 2.000 | 2.000 | 2.000 |
| Resin Dispersion Z | 28% | 2.143 | 2.143 | 2.143 | 2.143 | 2.143 |
| Total | | 100.000 | 100.000 | 100.000 | 100.000 | 100.000 |
| % NVM | | 20% | 20% | 20% | 20% | 20% |
| NNA:KP-140 | | 100:0 | 75:25 | 50:50 | 35:65 | 25:75 |

EXAMPLE IV

Neo Decanoic Acid and Zinc Neo Decanoate*

| Ingredient | % Actives | NDA-100B | NDA-75B | NDA-50B | NDA-35B | NDA-25B | KP140-STD2 |
|---|---|---|---|---|---|---|---|
| Water, tap | — | 38.568 | 38.768 | 38.968 | 39.088 | 39.168 | 39.368 |
| Diethylene glycol n-ethyl ether | 100% | 3.900 | 3.900 | 3.900 | 3.900 | 3.900 | 3.900 |
| Dipropylene glycol n-methyl ether | 100% | 3.000 | 3.000 | 3.000 | 3.000 | 3.000 | 3.000 |
| Ammonium Hydroxide | 28% | 0.800 | 0.600 | 0.400 | 0.280 | 0.200 | 0.000 |
| Zonyl FSE | 0.14% | 0.060 | 0.060 | 0.060 | 0.060 | 0.060 | 0.060 |
| Fluorad FC-120 | 0.25% | 0.020 | 0.020 | 0.020 | 0.020 | 0.020 | 0.020 |
| Polymer Emulsion B | 33% | 41.918 | 41.918 | 41.918 | 41.918 | 41.918 | 41.918 |
| AC-316 Wax Emulsion | 35% | 1.143 | 1.143 | 1.143 | 1.143 | 1.143 | 1.143 |
| Zinc Ammonium Carbonate | 15% ZnO | 2.448 | 2.448 | 2.448 | 2.448 | 2.448 | 2.448 |
| Neo Decanoic Acid | 100% | 2.236 | 1.677 | 1.118 | 0.782 | 0.559 | 0.000 |
| Zinc Neo Decanoate* | 100% | 1.764 | 1.323 | 0.882 | 0.618 | 0.441 | 0.000 |
| Tributoxyethyl phosphate | 100% | 0.000 | 1.000 | 2.000 | 2.600 | 3.000 | 4.000 |
| E-43 Wax Emulsion | 40% | 2.000 | 2.000 | 2.000 | 2.000 | 2.000 | 2.000 |
| Resin Dispersion Z | 28% | 2.143 | 2.143 | 2.143 | 2.143 | 2.143 | 2.143 |
| Total | | 100.000 | 100.000 | 100.000 | 100.000 | 100.000 | 100.000 |
| % NVM | | 20% | 20% | 20% | 20% | 20% | 20% |
| NDA:KP-140 | | 100:0 | 75:25 | 50:50 | 35:65 | 25:75 | 0:100 |

*zinc neo decanoate was prepared by heating a mixture of zinc oxide and neo decanoic acid to 120° C. for sixty minutes, allowing the salt to form and all residual water to boil off.

EXAMPLE V

Neo 919

| Ingredient | % Actives | N919-100 | N919-75 | N919-50 | N919-35 | N919-25 | KP140-STD3 |
|---|---|---|---|---|---|---|---|
| Water, tap | — | 37.091 | 37.726 | 38.361 | 38.742 | 38.996 | 39.631 |
| Diethylene glycol n-ethyl ether | 100% | 3.900 | 3.900 | 3.900 | 3.900 | 3.900 | 3.900 |
| Dipropylene glycol n-methyl ether | 100% | 3.000 | 3.000 | 3.000 | 3.000 | 3.000 | 3.000 |
| Ammonium Hydroxide | 28% | 0.800 | 0.600 | 0.400 | 0.280 | 0.200 | 0.000 |
| Zonyl FSE | 0.14% | 0.060 | 0.060 | 0.060 | 0.060 | 0.060 | 0.060 |
| Fluorad FC-120 | 0.25% | 0.020 | 0.020 | 0.020 | 0.020 | 0.020 | 0.020 |
| Polymer Emulsion B | 33% | 41.667 | 41.667 | 41.667 | 41.667 | 41.667 | 41.667 |
| AC-316 Wax Emulsion | 35% | 1.143 | 1.143 | 1.143 | 1.143 | 1.143 | 1.143 |
| Zinc Ammonium Carbonate | 15% ZnO | 4.176 | 3.741 | 3.306 | 3.045 | 2.871 | 2.436 |
| Neo 919 | 100% | 4.000 | 3.000 | 2.000 | 1.400 | 1.000 | 0.000 |
| Tributoxyethyl phosphate | 100% | 0.000 | 1.000 | 2.000 | 2.600 | 3.000 | 4.000 |
| E-43 Wax Emulsion | 40% | 2.000 | 2.000 | 2.000 | 2.000 | 2.000 | 2.000 |
| Resin Dispersion Z | 28% | 2.143 | 2.143 | 2.143 | 2.143 | 2.143 | 2.143 |
| Total | | 100.000 | 100.000 | 100.000 | 100.000 | 100.000 | 100.000 |
| % NVM | | 20% | 20% | 20% | 20% | 20% | 20% |
| Neo 919:KP140 | | 100:0 | 75:25 | 50:50 | 35:65 | 25:75 | 0:100 |

The following testing procedures were employed for measurement of physical properties of the formulations of Examples I–V. The results of the tests are shown in the following Tables I–VI.

Recoat Leveling and Wetting

Each prototype finish was coated on new Armstrong white vinyl composition tiles with mill finish removed. One half of each tile was coated with the prototype and one-half the tile was coated with the standard finish made with KP140 additive (KP140 std.). Forty minutes cure time was given between each coat. The application was done at 72° F. and 60% relative humidity. Each finish was applied with cheesecloth at 2 ml per square foot. Leveling and wetting of each finish was compared by eye and given a subjective rating of excellent, very good, good, poor or very poor.

Konig Hardness

One-half gram of each prototype finish was spread evenly on a level 75 mm×38 mm glass slide and allowed to cure for one, seven and twenty-eight days at 72° F. and 50% relative humidity. The Konig hardness of each cured film was measured using a pendulum hardness tester made by BYK Mallinckrodt.

Snell Capsule Resistance Properties

Each prototype finish was coated on new Armstrong white vinyl composition tiles with the mill finish removed. One half of each tile was coated with the prototype and one-half the tile was coated with the standard finish made with KP-140 additive. Forty minutes cure time was given between each coat. The application was done at 72° F. and 60% relative humidity. Each finish was applied with cheesecloth at 2 ml per square foot. Mark and scuff resistance testing was done using a Snell capsule drum made by Tester Sangyo Co. Ltd., Tokyo, Japan (03) 256-1035. Six new five square centimeter black rubber cubes were used in the Snell capsule. The prototype films were cured twenty-four hours at 50% RH, 72° F. Each prototype coating was subjected to 100 cycles in the Snell capsule. Mark and scuff resistance was compared to the standard by eye and given a subjective rating of:

| | |
|---|---|
| >> | superior to the standard |
| > | better than the standard |
| = | equal to the standard |
| < | not as good as the standard |
| << | much poorer than the standard |

Viscosity

The viscosity of each prototype floor finish was measured using a Brookfield LVT-E viscometer and a #1 spindle set at 60 cycles per minute.

Gloss Development

Each prototype finish was coated on new Armstrong white vinyl composition tiles with mill finish removed. One half of each tile was coated with the prototype and one-half the tile was coated with the standard made with KP140 additive. Forty minutes cure time was given between each coat. The application was done at 72° F. and 60% relative humidity. Each finish was applied with cheesecloth at 2 ml per square foot. Gloss of each coat was measured with HunterLab ProGloss Glossmeter at both 20 and 60 degrees.

pH

The pH of each finish was measured using a calibrated Radiometer Copenhagen PHM 82 Standard pH Meter and a saturated potassium hydroxide electrode.

TABLE I (Example 1)
Physical Properties

| Finish Code | Recoat Leveling & Wetting | Konig Film Hardness Value 7 Days | 28 Day | Snell Capsule Mark | Scuff | Finish Viscosity (centipoise) | pH | Four Coat Gloss, 24 Hours Cure 20 | 60 |
|---|---|---|---|---|---|---|---|---|---|
| NDA | good | 97 | 124 | > | > | 7.00 | 8.60 | 36 | 76 |
| NNA | very poor | 98 | 131 | = | = | 7.00 | 8.47 | 32 | 72 |
| NOA | very poor | 95 | 126 | < | < | 8.75 | 8.42 | 31 | 71 |
| NHA | poor | 90 | 126 | < | < | 10.50 | 8.34 | 29 | 69 |
| NA | poor | * | | >> | >> | 7.00 | 8.52 | 24 | 64 |
| OA | very poor | 65 | | >> | >> | 7.00 | 8.44 | 28 | 68 |
| MHA | very poor | 74 | | > | > | 11.00 | 8.39 | 28 | 69 |
| PPA | very poor | 83 | | > | > | 11.25 | 8.43 | 27 | 66 |
| OLA | very good | 88 | 121 | << | << | 7.00 | 8.70 | 35 | 74 |
| V262 | good | 106 | 123 | = | = | 7.00 | 8.87 | 40 | 79 |
| KP140 | excellent | 114 | 119 | std. | std. | 6.75 | 8.94 | 38 | 78 |

*poor film surface smoothness on glass developed, good hardness measurements were not possible for this sample. These tests were conducted to compare neo acids alone with conventional KP140 (standard), OLA and V262 plasticizers.

TABLE II (Example I)
Gloss Development Measurements at 20 & 60 Degrees

| Tile # Additive | 1 NDA | | 2 NNA | | 3 NOA | | 4 NHA | | 5 NA | | 6 OA | | 7 MHA | | 8 PPA | | 9 OLA | | 10 V262 | | KP140 avg. of 10 tiles | |
|---|---|---|---|---|---|---|---|---|---|---|---|---|---|---|---|---|---|---|---|---|---|
| Coat 0 (bare tile) | 2 | 9 | 2 | 10 | 2 | 10 | 2 | 9 | 2 | 9 | 2 | 9 | 2 | 9 | 2 | 9 | 2 | 9 | 2 | 9 | | |
| std. (bare tile) | 2 | 9 | 2 | 10 | 2 | 10 | 2 | 9 | 2 | 9 | 2 | 9 | 2 | 9 | 2 | 9 | 2 | 9 | 2 | 9 | 2 ± 0 | 9 ± 0 |
| Coat 1 | 10 | 41 | 13 | 44 | 11 | 41 | 8 | 35 | 7 | 32 | 8 | 35 | 8 | 34 | 7 | 32 | 8 | 36 | 9 | 37 | | |
| KP140 std. | 10 | 41 | 11 | 41 | 10 | 40 | 9 | 39 | 8 | 34 | 8 | 36 | 8 | 35 | 9 | 37 | 9 | 37 | 8 | 36 | 9 ± 1 | 38 ± 2 |
| Coat 2 | 29 | 67 | 31 | 67 | 25 | 62 | 19 | 55 | 24 | 62 | 22 | 58 | 22 | 60 | 20 | 57 | 24 | 63 | 25 | 64 | | |
| KP140 std. | 27 | 66 | 28 | 66 | 29 | 68 | 26 | 65 | 22 | 61 | 25 | 64 | 24 | 63 | 26 | 64 | 24 | 63 | 23 | 62 | 25 ± 2 | 64 ± 2 |
| Coat 3 | 50 | 82 | 45 | 79 | 38 | 74 | 30 | 67 | 32 | 69 | 37 | 74 | 32 | 69 | 30 | 68 | 43 | 78 | 45 | 79 | | |
| KP140 std. | 50 | 82 | 45 | 78 | 46 | 81 | 49 | 82 | 42 | 77 | 47 | 80 | 45 | 79 | 48 | 81 | 42 | 78 | 48 | 81 | 46 ± 3 | 80 ± 2 |
| Coat 4, initial | 61 | 86 | 47 | 80 | 45 | 79 | 40 | 75 | 36 | 69 | 42 | 77 | 40 | 76 | 37 | 74 | 52 | 82 | 58 | 86 | | |
| KP140 std. | 62 | 88 | 59 | 86 | 60 | 87 | 61 | 87 | 55 | 84 | 58 | 87 | 58 | 86 | 58 | 86 | 56 | 86 | 59 | 86 | 59 ± 2 | 86 ± 1 |
| Coat 4, next day | 36 | 76 | 32 | 72 | 31 | 71 | 29 | 69 | 24 | 64 | 28 | 68 | 28 | 69 | 27 | 66 | 35 | 74 | 40 | 79 | | |
| KP140 std. | 37 | 78 | 37 | 77 | 36 | 77 | 40 | 79 | 36 | 76 | 38 | 78 | 43 | 81 | 38 | 79 | 35 | 76 | 38 | 78 | 38 ± 2 | 78 ± 1 |

The results of these tests show neo acids have comparable gloss development to conventional KP140, OLA and V262 plasticizers.

TABLE III

(Example II)
Physical Properties

| Finish Code | Equivalents Zinc to Total Carboxyl | Recoat Leveling | Recoat Wetting | Konig Film Hardness Value 7 Days Cure | Snell Capsule Mark | Snell Capsule Scuff | Finish Viscosity (centipoise) | pH | Four Coat Gloss 24 Hours Cure 20° | Four Coat Gloss 24 Hours Cure 60° | Weight Percent NDA in Dry Film |
|---|---|---|---|---|---|---|---|---|---|---|---|
| NDA-100A | 0.12 | << | < | 52 | >> | >> | 6.90 | 8.40 | 42 | 81 | 20% |
| NDA-75A | 0.14 | < | = | 66 | >> | >> | 6.90 | 8.40 | 35 | 77 | 15% |
| NDA-50A | 0.16 | = | = | 88 | > | > | 6.90 | 8.39 | 37 | 78 | 10% |
| NDA-35A | 0.18 | = | = | 77 | > | > | 6.80 | 8.39 | 39 | 80 | 7% |
| NDA-25A | 0.20 | = | = | 91 | = | = | 6.90 | 8.40 | 40 | 80 | 5% |
| KP140-STD1 | 0.25 | standard | standard | 63 | standard | standard | 7.00 | 8.41 | 41 | 81 | 0% |

TABLE IV

(Example III)
Physical Properties

| Finish Code | Equivalents Zinc to Total Carboxyl | Recoat Leveling | Recoat Wetting | Konig Film Hardness Value 7 Days Cure | Snell Capsule Mark | Snell Capsule Scuff | Finish Viscosity (centipoise) | pH | Four Coat Gloss 14 Hours Cure 20° | Four Coat Gloss 14 Hours Cure 60° | Weight Percent NNA in Dry Film |
|---|---|---|---|---|---|---|---|---|---|---|---|
| NNA-100 | 0.12 | << | << | 61 | >> | >> | 6.50 | 8.27 | 40 | 79 | 20% |
| NNA-75 | 0.13 | < | = | 85 | >> | >> | 6.40 | 8.28 | 46 | 82 | 15% |
| NNA-50 | 0.16 | < | = | 106 | > | > | 6.60 | 8.28 | 46 | 83 | 10% |
| NNA-35 | 0.18 | = | = | 93 | = | = | 6.90 | 8.29 | 46 | 83 | 7% |
| NNA-25 | 0.19 | = | = | 89 | = | = | 6.90 | 8.31 | 45 | 83 | 5% |
| KP140-STD1 | 0.25 | standard | standard | 63 | standard | standard | 7.00 | 8.41 | 45 | 82 | 0% |

TABLE V

(Example IV)
Physical Properties

| Finish Code | Equivalents Zinc to Total Carboxyl | Recoat Leveling | Recoat Wetting | Konig Film Hardness Value 7 Days Cure | Snell Capsule Mark | Snell Capsule Scuff | Finish Viscosity (centipoise) | pH | Four Coat Gloss, 24 Hours Cure 20° | Four Coat Gloss, 24 Hours Cure 60° | Weight Percent NDA in Dry Film |
|---|---|---|---|---|---|---|---|---|---|---|---|
| NDA-100B | 0.20 | << | < | 65 | >> | >> | 13.00 | 8.22 | 30 | 71 | 20% |
| NDA-75B | 0.20 | < | = | 62 | >> | >> | 8.30 | 8.22 | 38 | 78 | 15% |
| NDA-50B | 0.20 | = | = | 88 | >> | >> | 7.00 | 8.22 | 38 | 79 | 10% |
| NDA-35B | 0.20 | = | = | 74 | > | > | 7.00 | 8.22 | 36 | 78 | 7% |
| NDA-25B | 0.20 | = | = | 89 | = | = | 6.90 | 8.23 | 36 | 78 | 5% |
| KP140-STD2 | 0.20 | standard | standard | 60 | standard | standard | 6.50 | 8.24 | 39 | 80 | 0% |

TABLE VI

(Example V)
Physical Properties

| Finish Code | Equivalents Zinc to Total Carboxyl | Redcoat Leveling | Redcoat Wetting | Konig Film Hardness Value 7 Days Cure | Snell Capsule Mark | Snell Capsule Scuff | Finish Viscosity (centipoise) | pH | Four Coat Gloss 24 Hours Cure 20° | Four Coat Gloss 24 Hours Cure 60° | Weight Percent N919 in Dry Film |
|---|---|---|---|---|---|---|---|---|---|---|---|
| N919-100 | 0.20 | < | < | 52 | >> | >> | 8.40 | 8.47 | 39 | 77 | 20% |
| N919-75 | 0.20 | < | = | 79 | >> | >> | 7.20 | 8.41 | 42 | 79 | 15% |
| N919-50 | 0.20 | = | = | 98 | >> | >> | 7.00 | 8.37 | 44 | 81 | 10% |
| N919-35 | 0.20 | = | = | 99 | > | > | 7.00 | 8.36 | 44 | 82 | 7% |

TABLE VI-continued (Example V)
Physical Properties

| Finish Code | Equivalents Zinc to Total Carboxyl | Redcoat Leveling | Redcoat Wetting | Konig Film Hardness Value 7 Days Cure | Snell Capsule Mark | Snell Capsule Scuff | Finish Viscosity (centi- poise) | pH | Four Coat Gloss 24 Hours Cure 20° | Four Coat Gloss 24 Hours Cure 60° | Weight Percent N919 in Dry Film |
|---|---|---|---|---|---|---|---|---|---|---|---|
| N919-25 | 0.20 | = | = | 95 | = | = | 6.60 | 8.35 | 43 | 82 | 5% |
| KP140-STD3 | 0.20 | standard | standard | 64 | standard | standard | 6.60 | 8.23 | 47 | 84 | 0% |

Referring to the Konig Hardness tests in the above Tables III–VI, it is seen that the blends of the indicated neo carboxylic acids with tributoxyethyl phosphate shows significant improvement over either product alone.

EXAMPLE VI

This Example illustrates formulas with neo decanoic acid wherein total plasticizer was varied from 8–12% and the ratio of neoacid to tributoxyethyl phosphate was 21:79 and 30:70. These formulas were subjected to the tests reported in the table below.

| Ingredient | Formula 1 | Formula 2 | Formula 3 | Formula 4 |
|---|---|---|---|---|
| Water, tap | 72.95 | 72.95 | 70.06 | 75.81 |
| Diethylene glycol n-ethyl ether | 3.96 | 3.96 | 3.96 | 3.96 |
| Dipropylene glycol n-methyl ether | 4.60 | 4.60 | 4.60 | 4.60 |
| Propylene glycol n-phenyl ether | 1.64 | 1.64 | 1.64 | 1.64 |
| Zonyl FSE w/30% DE | 1.40 | 1.40 | 1.40 | 1.40 |
| Fluorad FC-120 w/30% DE | 1.00 | 1.00 | 1.00 | 1.00 |
| Emulsion Polymer A | 60.89 | 60.89 | 64.18 | 57.62 |
| Emulsion Polymer D* | 22.84 | 22.84 | 24.08 | 21.60 |
| AC-316 Wax Emulsion | 11.70 | 11.70 | 11.70 | 11.70 |
| Zinc Ammonium Carbonate Solution | 9.24 | 9.24 | 9.24 | 9.24 |
| Tributoxyethyl phosphate (KP-140) | 2.58 | 2.30 | 1.15 | 3.45 |
| Neo Decanoic Acid | 0.70 | 0.98 | 0.49 | 1.48 |
| Resin Dispersion Y | 6.50 | 6.50 | 6.50 | 6.50 |
| Total | 200.00 | 200.00 | 200.00 | 200.00 |
| % Nonvolatile | 20.50% | 20.50% | 20.50% | 20.50% |
| % Total Plasticizer on Finish Solids | 8% | 8% | 4% | 12% |
| Ratio Neo Acid:Tributoxyethyl phosphate | 21:79 | 30:70 | 30:70 | 30:70 |
| Konig Hardness @ 7 Days | 73 | 76 | 78 | 61 |
| Snell Capsule Results, 100 cycles, 24 hour cure @ 75 F./50% RH | | | | |
| Black Rubber Mark Resistance with respect to Formula 1 | Standard | = | = | < |
| Scuff Resistance with respect to Formula 1 | Standard | = | > | < |
| Next Day Recoat | Excellent | Good | Poor | Good |
| 4 coat Gloss @ 20° & 60°, 24 hour cure | 43   80 | 42   81 | 51   85 | 36   75 |

Based on these test results, Formula 1 would be preferred as it has excellent next day recoat properties and standard resistance to rubber marking and scuffing.

As seen in the foregoing testing, neoacids when used in conjunction with another plasticizer in an aqueous coating composition has superior properties over either material when used alone. Further, the ratio of 21:79 of neoacid to plasticizer gives an unexpected advantage of excellent next-day recoat properties.

INDUSTRIAL APPLICABILITY

The aqueous polymeric coating compositions of this invention can be prepared by known procedures. They are employed as protective coatings and can be deposited on various substrates such as wood, metal, plastic and the like using standard techniques. The coating compositions are particularly useful as floor finish compositions. They include a blended plasticizing agent which give it improved properties such as next-day recoat and resistance to rubber marking and scuffing.

Other variations and modifications of this invention will be obvious to those skilled in this art. This invention is not to be limited except as set forth in the following claims.

That which is claimed is:

1. In an aqueous thermoplastic coating composition comprising water, at least one polymeric film forming agent comprising acrylic polymers, styrene/acrylic polymers, polyester polymers, polyurethane polymers, polyether polymers, polyaldehyde polymers, polycarbonates, or polyamides, and a plasticizing agent, the improvement wherein at least a portion of the plasticizing agent is selected from at least one tertiary uncured alkyl monocarboxylic acid containing an average of from about 6 to about 30 carbon atoms per molecule.

2. The composition of claim 1 wherein the tertiary alkyl monocarboxylic acid is one having the formula RR'R"CCOOH wherein each R, R' and R" group is an alkyl group containing at least one carbon atom and the average total number of carbon atoms in each R, R' and R" group is the range of from 4 to about 30.

3. The composition of claim 1 wherein the plasticizer is from 0.1% to 25% by weight of total nonvolatile solids content of the composition and the tertiary alkyl monocarboxylic acid is from 20% to 50% of the total plasticizer present.

4. The composition of claim 1 wherein the tertiary alkyl monocarboxylic acid is 2,2,-dimethyl octanoic acid.

5. The composition of claim 4 wherein the 2,2-dimethyl octanoic acid is present in a ratio of about 21 parts to about 79 parts of a remaining portion of the plasticizing agent.

6. The composition of claim 1 wherein the tertiary alkyl monocarboxylic acid is 2,2,4,4-tetramethyl pentanoic acid.

7. The composition of claim 1 wherein the tertiary alkyl monocarboxylic acid is 2-methyl-2-ethylpentanoic acid.

8. The composition of claim 1 wherein the tertiary alkyl monocarboxylic acid is 2-methyl-2-ethylbutanoic acid.

9. The composition of claim 1 wherein the tertiary alkyl monocarboxylic acid is a mixture of the monocarboxylic acids.

10. The composition of claim 9 wherein the mixture includes a blend of monocarboxylic acids having about 75% of acids with from about 10 to 13 carbon atoms and about 20% of acids with 14 carbon atoms per molecule.

11. The composition of claim 1 further including a zinc salt of the tertiary alkyl monocarboxylic acid.

12. The composition of claim 11 wherein the tertiary alkyl monocarboxylic acid is 2,2, dimethyl octanoic acid.

13. The composition of claim 1 wherein the polymeric film forming agent is an acrylic polymer.

14. A method of improving the physical properties of an aqueous thermoplastic coating composition, comprising water, at least one polymeric film forming agent comprising acrylic polymers, styrene/acrylic polymers, polyester polymers, polyurethane polymers, polyether polymers, polyaldehyde polymers, polycarbonates, or polyamides, and a plasticizing agent, wherein the improvement comprises replacing at least a portion of the plasticizing agent with at least one uncured tertiary alkyl monocarboxylic acid containing an average of from about 6 to about 30 carbon atoms per molecule.

15. The method of claim 14 wherein the tertiary alkyl monocarboxylic acid is one having the formula RR'R"CCOOH wherein each R, R' and R" group is an alkyl group containing at least one carbon atom and the average total number of carbon atoms in each R, R' and R" group is in the range of from 4 to about 30.

16. The method of claim 14 wherein the plasticizer is from 0.1 % to 25% by weight of total nonvolatile solids content of the composition and the tertiary alkyl monocarboxylic acid is from 20% to 50% of the total plasticizer present.

17. The method of claim 14 wherein the tertiary alkyl monocarboxylic acid is 2,2,-dimethyl octanoic acid.

18. The method of claim 17 wherein the 2,2-dimethyl octanoic acid is present in a ratio of about 21 parts to about 79 parts of a remaining portion of the plasticizing agent.

19. The method of claim 14 wherein the tertiary alkyl monocarboxylic acid is 2,2,4,4-tetramethyl pentanoic acid.

20. The method of claim 14 wherein the tertiary alkyl monocarboxylic acid is 2-methyl-2-ethylpentanoic acid.

21. The method of claim 14 wherein the tertiary alkyl monocarboxylic acid is 2-methyl-2-ethylbutanoic acid.

22. The method of claim 14 wherein the tertiary alkyl monocarboxylic acid is a mixture of the monocarboxylic acids.

23. The method of claim 22 wherein the mixture includes a blend of monocarboxylic acids having about 75% of acids with from about 10 to 13 carbon atoms and about 20% of acids with 14 carbon atoms per molecule.

24. The method of claim 14 further including a zinc salt of the tertiary alkyl monocarboxylic acid.

25. The method of claim 24 wherein the tertiary alkyl monocarboxylic acid is 2,2, dimethyl octanoic acid.

26. The method of claim 14 wherein the polymeric film forming agent is an acrylic polymer.

* * * * *

UNITED STATES PATENT AND TRADEMARK OFFICE
CERTIFICATE OF CORRECTION

PATENT NO. : 5,977,228
DATED : November 2, 1999
INVENTOR(S) : David H. Mauer

It is certified that error appears in the above-identified patent and that said Letters Patent is hereby corrected as shown below:

Col. 2, line 31
replace "Tex."
with --Texas--.

Col. 2, line 43
replace "Tex."
with --Texas--.

Col. 9 and 10 in "Additional Materials Used" table in description after "Emulsion Polymer D"
replace "having an acid number of about 00 and"
with --having an acid number of about 100 and--.

Col. 16, in Table I, under the heading "Four Coat Gloss, 24 Hours Cure"
replace "20"
with --20°--.

Col. 16, in Table I, under the heading "Four Coat Gloss, 24 Hours Cure"
replace "60"
with --60°--.

Col. 17, in Table VI, under the heading "Physical Properties" (third and fourth headings from the left)
replace "Redcoat" with --Recoat--.

Signed and Sealed this

Thirty-first Day of October, 2000

*Attest:*

Q. TODD DICKINSON

*Attesting Officer*     *Director of Patents and Trademarks*